United States Patent Office 3,793,284
Patented Feb. 19, 1974

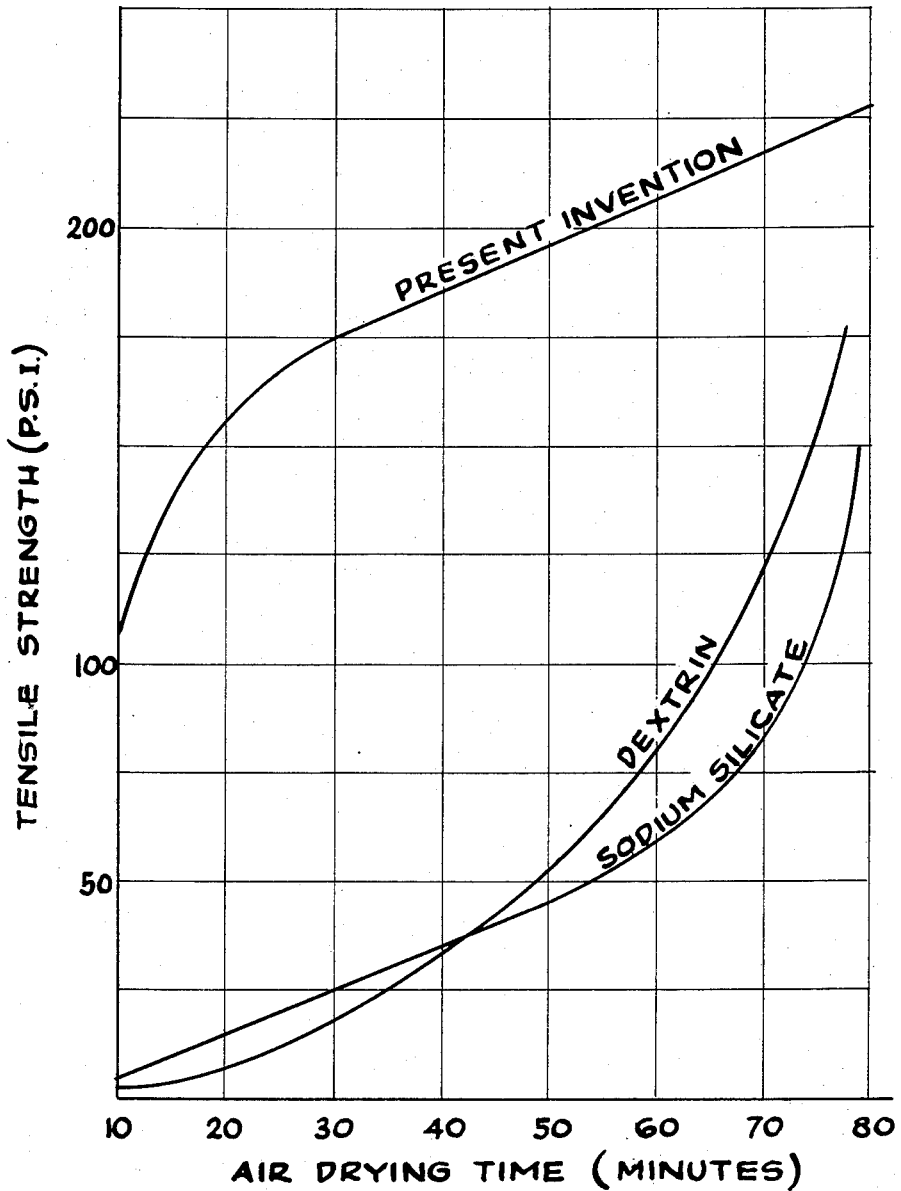

3,793,284
FOUNDRY CORE PASTE
Bela Klaudinyi, Chicago, Robert E. Fisher, Clarendon Hills, and Louis J. Jacobs, Chicago, Ill., assignors to Combustion Engineering, Inc., Windsor, Conn.
Continuation-in-part of abandoned application Ser. No. 888,786, Dec. 29, 1969. This application Dec. 22, 1971, Ser. No. 211,054
Int. Cl. C08c 11/24
U.S. Cl. 260—33.8 UA              1 Claim

ABSTRACT OF THE DISCLOSURE

A foundry core paste is disclosed for bonding core sections together which contains a methyl methacrylate resin, a solvent such as methylene chloride, a gelling and suspending agent, a filler and a plasticizer.

This application is a continuation-in-part of application Ser. No. 888,786, filed Dec. 29, 1969, and now abandoned.

BACKGROUND OF THE INVENTION

Foundry core pastes are used to bond sections of cores together to form completed cores which are used inside foundry molds to form a cavity inside of a metal casting. Such cores are usually made with silica or zircon sand with the sand grains being bonded together with a resin which is cured or polymerized by heating in an oven or by chemical catalysis. The various core sections are then pasted together as required.

There are several typical core paste compositions currently available on the market. One group of these pastes comprises mixtures of dextrin or a lignin sulfonate with a low cost filler such as finely ground silica flour. These pastes are in powder form to which water is added to obtain a creamy consistency. The mixed paste is applied to the sections of the core to be joined by brushing, extruding from a bulb, or by dipping. Another popular core paste mixture is composed of sodium silicate, finely divided silica flour and a small amount of clay. These types of pastes all require oven drying to develop good strength. Also, these pastes all contain water as the liquid and consequently are hydrophilic, whereas most core surfaces are hydrophobic since the materials used to bind the sand grains are hydrophobic oils or resins. Additionally, in the dextrin or the sodium silicate based pastes, water is strongly absorbed by the bonding ingredients. Consequently, the loss of water during drying is slow.

SUMMARY OF THE INVENTION

The foundry core paste of the present invention is based upon a completely different concept from the conventional water based pastes mentioned above. It is essentially a waterless paste which is fast setting and free of silica and which in the preferred form is nontoxic and nonflammable. It is air setting and requires no oven drying. An object of the present invention is, therefore, to provide an improved foundry core paste which exhibits the features and effects set forth above. These and other advantages will be more apparent from the detailed description which follows.

BRIEF DESCRIPTION OF THE DRAWING

The drawing is a graph illustrating the drying times versus tensile strength of the foundry core paste of the present invention compared to prior art pastes.

DESCRIPTION OF THE PREFERRED EMBODIMENTS

The foundry core paste of the present invention is characterized by a mixture of a resin, a hydrocarbon solvent for the resin, a gelling and suspending agent, and a filler. A plasticizer and prewetting agent for wetting the gelling agent may also be included. The resin used in the present invention is a methyl methacrylate polymer having a molecular weight in the medium range such as "Elvacite 2010" manufactured by E. I. du Pont de Nemours & Co., Inc. This particular resin has an inherent viscosity of 0.45 as measured on a solution containing 0.25 gram of the polymer in 50 ml. chloroform at 25° C. using a No. 50 Cannon-Fenske Viscometer. It also has high strength, good elasticity and has little tendency to migrate to the exposed surfaces along with the evaporating solvent. This last mentioned property is particularly important because a migrating binder will "skin over" or form a hard, brittle outer skin which contains most of the binder while leaving the heart of the joint relatively free of binder and thus weak. Of course, the specific methyl methacrylate resin mentioned is by way of example only, and other methyl methacrylate resins which exhibit the characteristics listed may be used.

The solvents used in the present invention are hydrocarbons suitable for the resin. The preferred solvent for the methyl methacrylate resin is methylene chloride because of its high vapor pressure and resultant rapid evaporation rate, non-flammability and excellent solvent power. The flammability factor is important for safety reasons particularly in a foundry. Other chlorinated solvents such as perchloroethylene, trichloroethane and trichloroethylene may be used but their slower evaporation rates require longer curing times.

In order to form a stable solution and prevent settling of the solids in the formulation, a gelling and suspending agent is included. A preferred agent is sold by the National Lead Company under the trademark "Bentone 27" which is a montmorillonite mineral in which inorganic cations have been exchanged with organic cations. This results in a compound which forms thixotropic gels in organic liquids. See U.S. Pat. 2,531,427. Other gelling and suspending agents can also be employed such as other Bentone products of National Lead Company and metallic soaps such as aluminum stearate and lithium hydroxystearate. For greater gelling efficiency, the gelling and suspending agents and particularly the Bentones should be prewetted with water and an alcohol such as methanol.

Finely divided clays are included in the mixture as a filler as well as to give bulk and absorb a certain amount of solvent. The clay itself should have a low bulk density so that it can be readily suspended without settling during long periods of storage. These clays should be nonabrasive, nonreactive and low cost. A preferred clay is Old Hickory #5 clay which is a finely divided, air-floated hydrous aluminum silicate mineral. However, any of a variety of finely ground fireclays or ball clays can be used such as kaolinite, montmorillonite, or halloysite. Material to be avoided is silica flour due to the danger of human exposure and to its abrasive effect on the mechanical equipment used to apply the core paste.

If it is desired to prevent the gradual embrittlement of the resin which might result if the pasted cores were to be stored for long periods of time, a plasticizer may be included in the formulation. Although any suitable plasticizer may be used, tricresyl phosphate has been found to be the most efficient with the methyl methacrylate resin. Another plasticizer which could be used is dibutyl phthalate.

The preferred composition of the present invention and the range for the amounts of each ingredient is as follows:

|  | Typical, percent | Range, percent |
|---|---|---|
| Methyl methacrylate | 13.90 | 10-25 |
| Methylene chloride | 54.00 | 40-65 |
| Bentone 27 filler | 2.70 | 0.5-5.0 |
| Methanol | 0.77 | 0.1-4.0 |
| Old Hickory #5 clay | 28.00 | 20-40 |
| Tricresyl phosphate | 0.60 | 0.0-2.0 |
| Water | 0.03 | 0.0-4.0 |

These ingredients are blended using the following procedure. Methylene chloride is placed in a liquid mixer or agitator and the methyl methacrylate is slowly added. When the resin is completely dissolved, the methanol, filler and water are premixed and added to the dissolved resin in the mixer. These ingredients are followed by the clay and one half of the tricresyl phosphate plasticizer and mixed for 15 min. Then the other half of the plasticizer is added and mixing is continued for an additional 15 min. The material is then ready to be packaged and shipped to the foundry.

The resulting paste is of such a consistency, 30,000 centipoises, that it is easily applied and flows or levels on the core face to form a ribbon of uniform thickness. The paste may be distributed in large quantities by means of pumps and flow guns for viscous liquid or it may be dispensed in smaller quantities from conventional paste bulbs or from polyethylene bags. The paste is applied to one surface of the two surfaces to be jointed and the parts are then firmly pressed together. The paste has a low angle of contact when applied and consequently it readily wets and penetrates the voids in the core surface. The methylene chloride solvent is readily removed from the joint areas by capillary action, leaving in the joint area a residue of gradual increasing viscosity. It is this property which gives the product its high strength shortly after assembly of the joint as indicated in the drawing. Upon further removal of the methylene chloride solvent from the joint area, a strong elastic joint develops with a very high adhesive and cohesive strength. This is in direct contrast to the brittle, hard sodium silicate or dextrin bond paste joints. Within 10 min. after assembly and with no oven drying the pasted cores can be placed in the mold cavity. All organic material is readily decomposed by the extremely high temperatures to which they are subjected during pouring of the molten metal. It has also been found that this foundry core paste has superior hot strength prior to burn-out when compared to conventional pastes. It will withstand 320° F. before failing under a 50 p.s.i. tensile load in comparison to 160-200° F. for conventional pastes. The tensile strength expressed in p.s.i. as a function of air drying time is shown in the drawing for the foundry core paste of the present invention as compared to several prior art types of pastes.

The foundry core paste of the present invention is a ready-to-use material that develops high strength rapidly after assembly and requires no oven drying or curing. No mixing of the paste is required at the time of usage and it is readily and easily applied. It will be understood that the description of the invention has been by way of example only and that the scope of the invention is as expressed in the following claim.

We claim:
1. An air drying, fast setting foundry core paste consisting essentially of 10-25 percent of a methyl methacrylate resin; 40-65 percent of a rapidly evaporating chlorinated hydrocarbon solvent for said resin; 0.5-5.0 percent of a gelling and suspending agent; and 20-40 percent of a finely divided clay filler, said clay filler being selected from the group consisting of fireclays and ball clays.

References Cited
UNITED STATES PATENTS

| 2,912,729 | 11/1959 | Webb | 260—41 A |
| 3,070,991 | 1/1963 | Holbrook et al. | 106—38.2 |
| 3,060,148 | 10/1962 | Evans et al. | 260—33.8 U |

LEWIS T. JACOBS, Primary Examiner

U.S. Cl. X.R.

260—41 A